US005600437A

United States Patent [19]

Erdentug

[11] Patent Number: 5,600,437

[45] Date of Patent: Feb. 4, 1997

[54] APPARATUS FOR AND A METHOD OF INSPECTING OBJECTS

[75] Inventor: Mehmet A. Erdentug, Worcester, England

[73] Assignee: Parascan Technologies Limited, Coleshill, England

[21] Appl. No.: 408,494

[22] Filed: Mar. 22, 1995

[30] Foreign Application Priority Data

Mar. 25, 1994 [GB] United Kingdom .................... 9405939

[51] Int. Cl.[6] ...................... G01N 21/88

[52] U.S. Cl. .................... 356/237; 356/236; 356/446

[58] Field of Search .................... 356/236, 446, 356/237; 250/228

[56] References Cited

U.S. PATENT DOCUMENTS

| | | | |
|---|---|---|---|
| 2,646,880 | 7/1953 | Frankel | 250/228 |
| 2,803,756 | 8/1957 | Cox | 356/236 |
| 3,838,926 | 10/1974 | Kato et al. | 356/236 |
| 3,914,601 | 10/1975 | Hoover et al. | 250/220 |
| 4,186,838 | 2/1980 | Levitt et al. | 356/435 |
| 4,280,625 | 7/1981 | Grobbelaar et al. | 209/582 |
| 4,645,922 | 2/1987 | Welbourn et al. | 356/236 |

FOREIGN PATENT DOCUMENTS 2018419 10/1979 United Kingdom .

*Primary Examiner*—Richard A. Rosenberger
*Attorney, Agent, or Firm*—Lahive & Cockfield; Anthony A. Laurentano

[57] ABSTRACT

Inspection apparatus comprising a light sphere and a translucent conduit passing therethrough. A light source is in communication with the interior of the sphere and is positioned to one side of the conduit. A sensor positioned to the side of the conduit remote from the light source operates to sense variations in the intensity of the light within the sphere caused by objects passing through the conduit.

6 Claims, 1 Drawing Sheet

APPARATUS FOR AND A METHOD OF INSPECTING OBJECTS

This invention relates to apparatus for and a method of inspecting moving objects. More especially, but not exclusively, the invention concerns apparatus for detecting the presence of incorrectly shaped or discolored objects in a stream of moving objects.

Many mass produced relatively small objects such as capsules are conventionally subjected to a visual inspection as they are moved along a continuous belt conveyor to, for example, a packaging station. Defects to be detected include variations in object size and color. Visual inspection, while relatively successful, cannot be relied upon to detect objects having, for example, only minor differences in size and coloration from those desired. It is also a relatively slow process.

The present invention sets out to provide inspection apparatus which automatically detects the presence of wrongly sized and/or discolored objects in a rapidly moving continuous stream of such objects.

According to the present invention in one aspect there is provided inspection apparatus including a closed structure whose internal wall surfaces are adapted to diffuse light emitted from a shielded light source to produce a state of light equilibrium within the structure, a translucent conduit positioned within and extending through the interior of the structure, and a sensor operable to detect and measure changes in the state of light equilibrium within the structure caused by objects passing through the conduit.

In another aspect, the invention provides inspection apparatus which comprises a light sphere, a translucent conduit passing through the light sphere, a light source in communication with the interior of the sphere and positioned to one side of the conduit, and a sensor positioned to the side of the conduit remote from the light source and operable to sense variations in the intensity of the light within the sphere caused by objects passing through the conduit.

The invention will now be described by way of example only with reference to the accompanying diagrammatic drawings in which.

Figure 1:
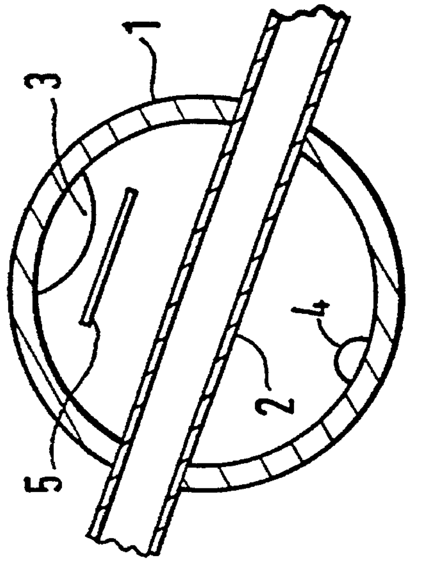
FIG. 1 is a side view in section of inspection apparatus in accordance with the invention.

The inspection apparatus illustrated in FIG. 1 includes a light sphere 1 through which passes a translucent conduit 2. The conduit 2 is inclined to the horizontal and its longitudinal axis passes along a center line of the sphere 1. A lamp 3 is positioned to one side of the sphere to illuminate the sphere interior and a sensor 4 is also provided, this being positioned in the side of the sphere remote from the lamp. A shield 5 is provided to spread evenly within the sphere 1 the light emitted by the lamp 3. The internal walls of the sphere are colored white to cause the light emitted by the lamp to be diffused evenly within the sphere to produce, in a known way, a state of light equilibrium.

The sensor 4 is calibrated to emit electronic signals to a control mechanism if variations in light intensity within the sphere above or below predetermined levels occur.

Figure 2:
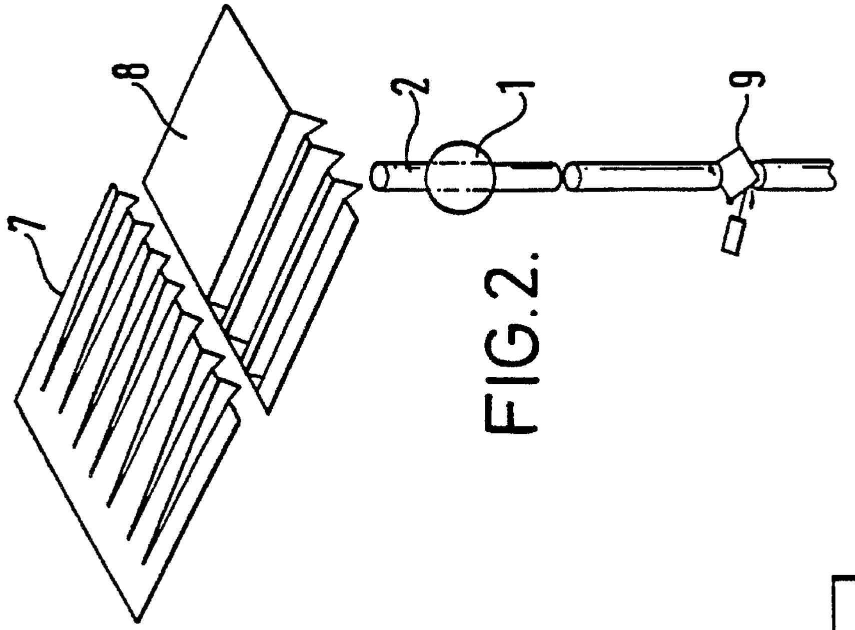
FIG. 2 is a side elevational view of the apparatus illustrated in FIG. 1 to a reduced scale positioned within an inspection line.

As will be seen from FIG. 2, the inspection apparatus illustrated in FIG. 1 is used to inspect and/or count a stream of capsules moving along a series of continuous conveyors. The illustrated apparatus includes a vibratory laning conveyor 7 which is inclined and channelled to accelerate and align capsules to be inspected and to deposit them onto an inclined separation conveyor 8 in which the capsules are streamed into discrete lines. Capsules leaving the separation conveyor 8 are deposited into the open end of one of several translucent conduits 2 each of which passes through one of several light spheres 1. The translucent conduits are inclined as shown in FIG. 1. Positioned below each sphere 1 is a reject mechanism 9 which is triggered by signals received from the sensor 4.

As mentioned above, the sensor 4 of each sphere 1 is calibrated prior to use by passing standard capsules through the respective sphere. Thus electronic signals are only emitted by the respective sensor 4 when a capsule having a shape or color dissimilar from that of predetermined standards passes through the conduit 2. The reject mechanism 9 is timed to remove rejected capsules from the continuous stream. The reject mechanism may comprise a nozzle connected to discharge an air jet onto a rejected capsule or a mechanical flip/flop valve. Indeed any conventional reject mechanism may be employed.

In use, capsules leaving the separation conveyor 8 travel sequentially through the translucent conduits 2 and the light spheres 1. As each capsule passes through a sphere, its presence produces a change in the light equilibrium within that sphere, the resulting variation in light intensity being detected and measured by the respective sensor 4. If the capsule is of the required shape and coloration the resulting change in light intensity caused by the sphere is within the calibrated levels and the capsule simply passes through the sphere for subsequent processing. In the event that it is not of the required shape or coloration, the resulting change in light intensity is either above or below the calibrated value of the sensor so causing an electronic signal to be emitted to operate the reject mechanism 9. Thus, unwanted variations in size and/or color are recognized by the light sensor 4 and under or oversized or discolored capsules are removed from the line by operation of the reject mechanism 9. Each sensor 4 may also be connected to a counter to count the number of capsules passing through each sphere. Alternatively, a separate sensor may be provided for this purpose.

Figure 3:
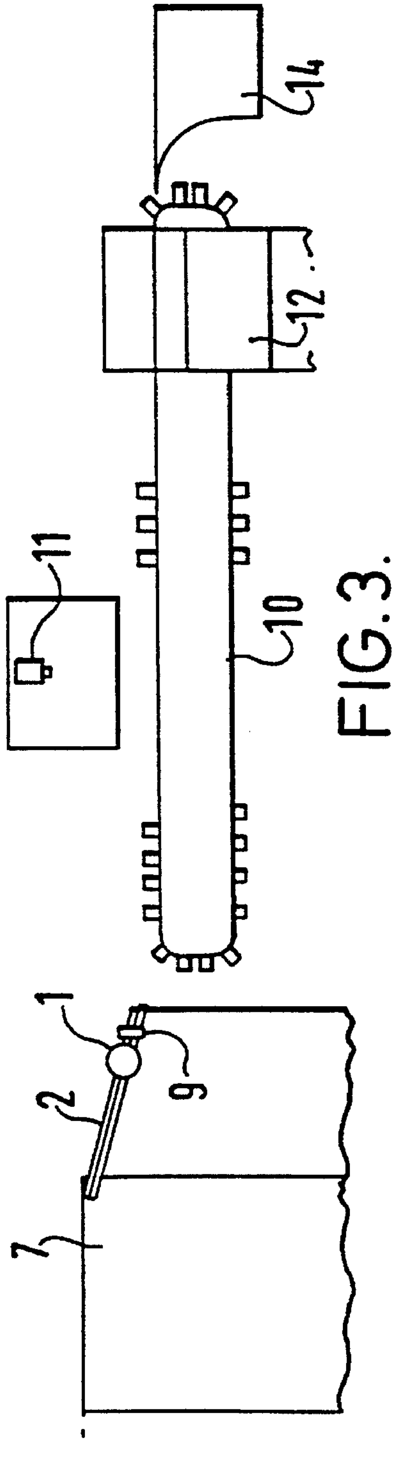
FIG. 3 is a side view of an inspection line including apparatus in accordance with the invention.

In the arrangement illustrated in FIG. 3 capsules are delivered by laning conveyors 7 to a multiplicity of inclined translucent conduits 2, (only one of which is shown) each of which passes through a respective light sphere 1. Oversized, undersized or discolored capsules are removed from the line by the reject mechanism 9.

On leaving the translucent conduits 2, the capsules are collected in trays carried by a continuous belt conveyor 10 for visual inspection using an overhead camera 11, rejected capsules being collected in a reject bin 12. Capsules which meet the required size and color criteria are delivered by the conveyor 10 to a delivery station 14.

It will be appreciated that the foregoing is merely exemplary of inspection apparatus in accordance with the invention and that modifications can readily be made thereto without departing from the true scope of the invention. Thus, the light sphere may be of any required shape or configuration, the sole requirement being that a state of diffused light equilibrium is created within the sphere interior so that unwanted charges in this state can be detected and appropriate remedial action taken.

I claim:

1. Apparatus for detecting the presence of incorrectly shaped and discolored objects in a stream of such objects moving along a path, the apparatus comprising a single spherically-shaped closed structure whose internal wall surfaces are adapted to diffuse light emitted from a shielded light source to produce a state of light equilibrium within the structure, an open-ended inclined translucent conduit positioned within and extending through the interior of the structure with its inclined longitudinal axis passing along a center line of the sphere, a sensor calibrated to detect changes in light intensity above or below desired upper and lower values caused by misshapen or discolored objects passing through the conduit, and a reject mechanism positioned below a lowermost opening of the conduit and operable upon signals received from the sensor to remove misshapen and discolored objects from the path taken by the moving objects.

2. Apparatus according to claim 1, wherein the internal walls of the closed structure are white.

3. Apparatus according to claim 1, wherein the light source is positioned within the closed structure.

4. Apparatus according to claim 1, wherein the conveyor means comprises a vibratory laned conveyor having at least one inclined channel aligned with an uppermost opening of the conduit.

5. Apparatus according to claim 4, in which a plurality of closed structures are provided, each such structure having a respective conduit that is positioned to receive objects from one of several channels of the vibrating laned conveyor.

6. Apparatus according to claim 1, wherein the reject mechanism comprises a nozzle connected to discharge an air jet onto a misshapen or discolored object.

* * * * *